US008772438B2

(12) United States Patent
Whiston et al.

(10) Patent No.: US 8,772,438 B2
(45) Date of Patent: Jul. 8, 2014

(54) PREPARATION OF POLYAMIDES

(75) Inventors: Keith Whiston, Darlington (GB); Charles Richard Langrick, Middlesbrough (GB); Kenneth Richard Seddon, Donaghadee (IE); Alberto V. Puga, Belfast (IE)

(73) Assignee: Invista North America S.àr.l., Wilmington, DE (US)

( * ) Notice: Subject to any disclaimer, the term of this patent is extended or adjusted under 35 U.S.C. 154(b) by 19 days.

(21) Appl. No.: 13/382,363

(22) PCT Filed: Jun. 30, 2010

(86) PCT No.: PCT/GB2010/001268
§ 371 (c)(1),
(2), (4) Date: Feb. 17, 2012

(87) PCT Pub. No.: WO2011/004138
PCT Pub. Date: Jan. 13, 2011

(65) Prior Publication Data
US 2012/0264907 A1    Oct. 18, 2012

Related U.S. Application Data

(60) Provisional application No. 61/224,215, filed on Jul. 9, 2009.

(51) Int. Cl.
*C08G 69/16*    (2006.01)
*C08G 69/28*    (2006.01)
*C08L 77/00*    (2006.01)

(52) U.S. Cl.
USPC .......... 528/310; 525/420; 525/432; 528/312; 528/313; 528/314; 528/319; 528/323; 528/324; 528/325; 528/326; 528/328; 528/329.1; 528/335; 528/336; 528/337; 528/338; 528/339; 528/340

(58) Field of Classification Search
USPC ......... 528/310, 312, 313, 314, 319, 323, 324, 528/325, 326, 328, 329.1, 335, 336, 337, 528/338, 339, 340; 525/420, 432
See application file for complete search history.

(56) References Cited

U.S. PATENT DOCUMENTS

| 5,543,495 A | 8/1996 | Anolick et al. |
| 5,955,569 A | 9/1999 | Dujari et al. |
| 7,157,588 B2 | 1/2007 | Harmer et al. |
| 2010/0311918 A1* | 12/2010 | Toufaili ................. 525/419 |

FOREIGN PATENT DOCUMENTS

| EP | 0039524 | 11/1981 |
| EP | 0077106 | 1/1986 |
| WO | WO2006/136529 | 12/2006 |
| WO | WO2008/145312 | 12/2008 |
| WO | WO2009/101032 | 8/2009 |
| WO | WO2010/086574 | 8/2010 |

OTHER PUBLICATIONS

"Direct Polycondensation in Ionic Liquids", E.I. Lozinskaya, A.S. Shaplov, Ya.S. Vygodskii, European Polymer Journal 40 (2004) 2065-3075.
"Ionic Liquids as Novel Reaction Media for the Synthesis of Condensation Polymers", Y.S. Vygodskii, E.I. Lozinskaya, A,S. Shaplov, Macromol. Rapid Commun. 2002, 23, pp. 676-680.
Org. Polymer Chemistry Res. Lab., Dept. of Chemistry, Isfahan U. of Technology,Republic of Iran, S. Mallakpour, Z. Rafiee, Polymer Degradation and Stability 93 (2008) 753-759.
Ionic Liquid Catalyzed Synthesis of Organosoluble Wholly Aromatic Optically Active Polyamides, S. Mallakpour, H. Seyedjamali, Polym. Bull. (2009) 62:605-614.
Weber in Kirk-Othmer Encyclopedia of Chemical Technology, 4th Ed., vol. 19, pp. 454-518, (2001).
Zimmerman in Encyclopedia of Polymer Science and Technology, 2nd Ed., John Wiley, vol. 11, pp. 315-381, (1989).
Preston in Encyclopedia of Polymer Science and Technology, 2nd Ed., John Wiley, vol. 11, pp. 381-409, (1989).
"Polymer Synthesis in Ionic Liquids", D.M. Haddleton, T. Welton and A.J. Carmichael, Ionic Liquids in Synthesis, 2nd Ed., P. Wasserscheid and T. Welton (Eds.), (2008).

* cited by examiner

*Primary Examiner* — Ana Woodward
(74) *Attorney, Agent, or Firm* — Robert B. Furr, Jr.

(57) ABSTRACT

A process for making a polyamide polymer, said process comprising heating, in one or more ionic liquid(s), one or more polyamide precursor(s) selected from: (i) one or more free dicarboxylic acid(s) or ester(s) thereof, with one or more diamine(s); or (ii) one or more salt(s) of a dicarboxylic acid with a diamine; or (iii) one or more lactam(s); or (iv) mixtures of any of the foregoing precursors (i) to (iii).

18 Claims, No Drawings

PREPARATION OF POLYAMIDES

BACKGROUND TO THE INVENTION

1. Field of Invention

The disclosure herein relates to a process of chemical transformation employing means to form polyamides and a process for producing the same from dicarboxylic acids and diamines, nylon salts or lactams; and combinations of these. More particularly this invention relates to a process for forming polyamides, including those polyamides having high melting temperatures. The process disclosed herein provides for the suppression of thermal degradation, rearrangement and/or side reactions which may occur at high temperatures, or at higher processing temperatures demanded by a higher melting temperature polyamide. In particular the polymerization process herein relates to one conducted in an ionic liquid (IL).

2. Description of the Related Art

There are known methods by which polyamides may be synthesised. Weber in *Kirk-Othmer Encyclopedia of Chemical technology*, Fourth Edition, Volume 19, page 454-518; and Zimmerman in *Encyclopedia of Polymer Science and Technology*, Second Edition, John Wiley, Volume 11 pages 315-381, and Preston in *Encyclopedia of Polymer Science and Technology*, Second Edition, John Wiley, Volume 11 pages 381-409 and references therein, describe such methods.

Where a reactant used to form a polyamide polymer or the polymer itself is sensitive to temperatures below the polymer melt temperature, the "Acid Chloride reaction" is often used to produce the polymer. Typically, the reaction is carried out between a diacid chloride and a diamine in a solvent for the reactants at low to moderate temperatures in the presence of a base to neutralise the hydrogen chloride produced. If the polyamide is insoluble in the solvent used for the reaction and precipitates out as it forms, this may limit the achievable molecular weight. To overcome this molecular weight limitation, powerful solvents are employed, often based upon amides such as dimethylacetamide with added calcium salt. Such a method, and variants of it, are used commercially to produce wholly aromatic polyamides, commonly known as aramides. However, acid chlorides are expensive raw materials requiring special handling due to their corrosive nature and their sensitivity to moisture.

It would be more desirable to use readily available, easily handled, low-cost raw materials, such as organic dicarboxylic acids and organic diamines; nylon salts; or lactams. However, these substances tend to be much less reactive than the acid chlorides. Other means to induce a direct polymerization reaction using such materials is of ongoing interest in the art.

The "direct polycondensation" of aromatic diamines with aromatic dicarboxylic acids may be accomplished in solution, often amide solvents with added lithium or calcium salts to keep the products in solution during the whole reaction, by the addition of triarylphosphite, such as triphenylphosphite, and sometimes in the presence of species such as pyridine to activate the reaction. In this type of reaction the water formed as the condensate of the polycondensation reaction is effectively removed from the reaction by reacting with, and hydrolysing the triphenylphosphite, and hence drives the reaction to completion. A significant disadvantage of this process is that the hydrolysis results in the liberation of phenol, which must be handled with care and in commercial practice the phenol is isolated and treated as a co-product.

Another means of accessing the desirable monomer feed stocks is to use high temperatures to activate and to induce the polymerization reaction. In the case of lactam monomers additional species, such as water and nylon salts, are used to initiate the ring opening reaction.

Today in commercial processes for producing aliphatic or semi-aromatic polyamides a melt polymerization reaction, either the "direct amidation" method (organic dicarboxylic acids and organic diamines; or nylon salts, or amino-alkanoic acids) or the hydrolytic "ring opening" reaction (lactams) are used. In these types of reactions high temperature and pressure profiles are employed to maintain the polymerizing material in a fluid state with the increasing level of polymerization. Nylon 6,6 and Nylon 6 are typical of aliphatic polyamides made by a melt polymerization method; both of these polymers are complete in their polymerization process at around 285° C. At the finish of the polymerization process, the polymer is pelletized ready for further processing, such as fibre spinning, compounding or further polymerization in the solid state.

Some polyamides, however, are less amenable to being produced by melt polymerization methods. Nylon 4,6 polymer, for instance, has a higher melting point than Nylon 6,6 and so any melt polymerization method must be completed at even higher temperatures than that used for Nylon 6,6 or Nylon 6. However, a significant drawback of this is that thermal degradation reactions occur at these temperatures, producing species that limit the molecular weight of the polymer. European Patent No. 039524 discloses a method to produce a polymer of useful molecular weight where the polymerization reaction is terminated whilst the polymer is still at a low molecular weight, effectively forming a "pre-polymer" with a content of molecular weight-limiting species that still allows some further polymerization by lower temperature, 260° C., solid phase polymerization methods. European Patent No. 077106 discloses a process for making Nylon 4,6 by heating adipic acid and 1,4-diaminobutane in an inert polar organic solvent, such as 2-pyrrolidone, at temperatures above 150° C., up to 180° C. as exemplified, and in which the polymer dissolves at these temperatures. That the temperature of reaction in the exemplification is much higher than the flash point of the 2-pyrrolidone solvent (113° C.) makes this an unattractive commercial process because of the challenging processing conditions.

Another family of polyamides less amenable to being produced by melt polymerization methods are those which contain a significant amount of aromatic dicarboxylic acids, such as terephthalic acid or isophthalic acid. Such monomers may confer some desirable properties to the polyamide, such as higher glass transition temperature or high melting point or higher viscosity for a given degree of polymerization as compared to all aliphatic polyamides. But they also bring with them disadvantages, such as higher melt viscosities which cause problems when extruding the polymer from the melt polymerization vessel; those with a high melting point have to be processed at temperatures where significant side reactions occur and give rise to branched species which may be deleterious to physical properties in the final product.

In the art of polyamide polymer formation there remains a need for polymerization methods conducted at lower temperature and useful with aliphatic and aromatic content polymers using readily available, easily handled, low cost raw materials. Such temperatures should be lower than those demanded by the traditional polyamide melt polymerization methods. The process chemistry should also be achievable without the generation of low-value co-products or difficult processing conditions.

SUMMARY OF THE INVENTION

According to the present invention, there is provided a process for making a polyamide polymer, said process comprising heating, in one or more ionic liquid(s), one or more polyamide precursor(s) selected from:
  (i) one or more free dicarboxylic acid(s) or ester(s) thereof, with one or more diamine(s); or
  (ii) one or more salt(s) of a dicarboxylic acid with a diamine (referred to herein as a "nylon salt"); or
  (iii) one or more lactam(s); or
  (iv) mixtures of any of the foregoing precursors (i) to (iii).

In the process of the present invention, the reaction medium preferably consists essentially of, and typically consists of, said one or more ionic liquid(s) and said one or more polyamide precursor(s). In particular, the process of the present invention is conducted in the absence of triphenylphosphite or other condensing agents. It is particularly surprising that the reaction proceeds without the need to add additional components such as a condensing agent.

In the process of the present invention, the ionic liquid is typically first purged with nitrogen by sparging the gas through the liquid, with stirring, for up to about 1 hour (typically about 15 minutes). The polyamide precursor(s) is/are then added to the ionic liquid, with stirring, and the reaction mixture heated to the desired reaction temperature, typically also under a nitrogen atmosphere, and the mixture stirred vigorously for the desired reaction time. Preferred reaction temperatures are in the range of from about 100 to about 300° C., preferably from about 180 to about 250° C., more preferably from about 200 to about 220° C. The reaction time may be varied, but the inventors have found that reaction times of up to about 10 hours are suitable, and typically from about 3 to about 6 hours. During the reaction, water produced by the condensation reaction is distilled off. Towards the end of the reaction, the purge flow nitrogen is increased in order to aid water removal form the system. Upon cooling, the polyamide is isolated using conventional techniques, and typically by solvent extraction.

In the process of the present invention, additives such as pigments, anti-oxidants, and UV-stabilizers etc., may be introduced before or during the polymerization reaction.

The polyamides produced by the present invention preferably exhibit a relative viscosity of at least about 5, and preferably at least about 15 and in one embodiment in the range from about 15 to about 50. The reaction product may be post-polymerised in order to increase molecular weight and viscosity accordance with techniques known in the art. For example, U.S. Pat. No. 5,543,495 discloses a process for increasing the molecular weight of polyamides and other condensation polymers by first injecting an inert gas into the polymer melt at elevated pressure, then stripping the volatiles from the polymer through the application of reduced pressure, followed by holding the polymer at elevated temperatures long enough for a reaction to occur which builds polymer molecular weight and thus its relative viscosity. U.S. Pat. No. 5,955,569 discloses a method for solid phase polymerization and increasing the relative viscosity and molecular weight of a polyamide polymer (such as nylon 6,6, nylon 6, and the like) while in the solid state involving the use of a phosphorus-containing catalyst (such as 2(2'-pyridyl) ethyl phosphonic acid or the like) in combination with an oxygen free gas characterized by a low dew point temperature; typically below 30° C. and preferably below −30° C. The disclosures of U.S. Pat. No. 5,543,495 and U.S. Pat. No. 5,955,569 are hereby incorporated in their entirety by reference forming a portion of this disclosure.

The polyamide polymers produced by the process of the present invention may be wholly aromatic polyamides, or may be wholly aliphatic polyamides, or may be mixed aliphatic-aromatic polyamides. In the case of mixed aliphatic-aromatic polyamides, the polyamides contain greater than 0% and less than 100% aliphatic residues, and contain greater than 0% and less than 100% aromatic residues. Thus, aromatic polyamide polymers may be derived from one or more aromatic dicarboxylic acid(s) and one or more aromatic diamine(s). Aliphatic polyamide polymers may be derived from one or more aliphatic dicarboxylic acid(s) and one or more aliphatic diamine(s). Alternatively, the polyamide polymers may be derived from one or more aliphatic and/or aromatic dicarboxylic acid(s) and one or more aliphatic and/or aromatic diamine(s), and in this embodiment the polyamide polymers may be derived either from one or more aliphatic dicarboxylic acid(s) and one or more aromatic and/or aliphatic diamine(s), or from one or more aromatic dicarboxylic acid(s) and one or more aliphatic and/or aliphatic diamine(s).

The polyamides produced by the process of the present invention may be linear, branched, hyperbranched or denditric structured polyamides. In one embodiment, the polyamides are linear.

The polyamides produced by the process of the present invention include those suitable for the manufacture of fibers, plastics, films and molding compositions.

DESCRIPTION OF THE PREFERRED EMBODIMENTS

The applicants have discovered a process to produce polyamides using a polymerization process which uses readily available, easily handled, low cost raw materials selected from organic dicarboxylic acids and organic diamines; nylon salts; lactams; and combinations of these, wherein these raw materials are heated in an ionic liquid whereupon a polycondensation reaction ensues at a temperature lower than that demanded by the traditional polyamide melt polymerization method without the generation of lower valued co-products or posing difficult processing conditions and overcomes the deficiencies of excessive thermal degradation or rearrangement and side reactions. The use of nylon salts as the polyamide precursor is of particular interest here.

Ionic liquids or low temperature molten salts are known in the art as very low volatility solvents suitable for carrying out a range of chemical reactions. Polymerization reactions have also previously been described in ionic liquids but these have been almost exclusively polymerization reactions giving rise to amorphous polymers such as PMMA or polyolefins (see *Polymer Synthesis in Ionic Liquids*, Haddlelton D. M., Welton T., Carmichael A. J. in *Ionic Liquids in Synthesis*, Wasserchheid P., Welton T. Eds. 2008, Wiley). Ionic liquids offer the benefit in these applications of avoiding potentially large volumes of vapour produced at reaction temperatures when alternative conventional solvents are used.

However, it has not previously been disclosed that ionic liquids can beneficially be employed as solvents for condensation polymerization in which the above mentioned disadvantages are overcome and in which said polyamide polymers are produced straightforwardly from the corresponding salt with the removal of water by evaporation. Previous disclosures involving the production of polyamide or polyimide materials in ionic liquids indicate that either anhydrides or acid chlorides must be used as starting materials or that dehydrating agents must be added to the reaction mixture. For example Vygodskii et al. teach the use of anhydrides for the synthesis of polyimides in ionic liquid solvents and the need for acid chloride precursors for the synthesis of polyamides in an ionic liquid (*Macromol. Rapid Commun.* 2002, 23, 676-680). In addition, Vygodskii et al. (*European Polymer Journal* 40 (2004) 2065) and Malakpour et al. (*Polymer Degra-*

*dation and Stability* 93 (2008) 753) teach the need for condensation agents, for example triphenyl phosphite, in the synthesis of polyamides in an ionic liquid, but this is disadvantageous because of the generation of phenol during the reaction.

An ionic liquid is a liquid that contains essentially only ions, i.e. molten salts, although some ionic liquids are in a dynamic equilibrium wherein the majority of the liquid is made up of ionic rather than molecular species. In one embodiment, the term "ionic liquid" refers to a salt whose melting point is relatively low, and in particular below about 100° C. Ionic liquids are typically salts of bulky and asymmetric organic cations. For instance, U.S. Pat. No. 7,157,588 teaches compositions based on N-substituted pyrrolidinones having a pendant ammonium cation separated from the pyrrolidone ring by a variable length alkyl spacer. WO 2006/136529 teaches pyrazolium alkylsulfates and a method for their production. The process of the present invention may utilise a single ionic liquid or a mixture of two or more ionic liquids. Typically, one or two, and typically only one ionic liquid is used.

In one embodiment, the ionic liquid(s) comprises a cation selected from one or more of 1-alkylpyridinium (N-alkylpyridinium), alkyl- or polyalkyl-pyridinium, phosphonium ($PR_4^+$), alkyl- or polyalkyl-phosphonium (particularly tetraalkylphosphonium), imidazolium, alkyl- or polyalkyl-imidazolium (particularly 1,3-dialkylimidazolium), ammonium ($NR_4^+$), alkyl- or polyalkyl-ammonium (particularly tetraalkylammonium), alkyl- or polyalkyl-pyrazolium, alkyl- or polyalkyl-pyrrolidinium (particularly dialkylpyrrolidinium), alkyl or polyalkyl-azepinium, alkyloxonium, and alkysulfonium. Each R group of the phosphonium and ammonium cations may be independently selected from the group of substituents consisting of hydrogen, hydroxyl, alkyl, alkyl ethers, alkyl esters, alkyl amides, alkyl carboxylic acids, or sulfonate. Examples include N-ethylpyridinium; N-methyl-N-alkylpyrrolidinium such as N-butyl-N-methylpyrrolidinium; N-methyl-N-(butyl-4-sulfonic acid)pyrrolidinium; 1-alkyl-3-alkylimidazolium such as 1-butyl-3-methylimidazolium (BMIM; also referred to as N-Methyl-N'-butylimidazolium) and N-methyl-N'-ethylimidazolium; trimethyl-(2-hydroxy-ethyl)ammonium; and tetradecyltrihexylphosphonium ([CAS #258864-54-9], referred to herein as [$P_{66614}$]).

A number of different anions may be employed, including inorganic anions and large organic anions. In one embodiment, the anion of the ionic liquid(s) is selected from one or more of a halide (preferably chloride, bromide or iodide), nitrate, an alkylsulfonate or alkyl polyalkoxysulfonate, hydrogensulfate, hexafluorophosphate and tetrafluoroborate, and other anions based on nitrogen, phosphorous, sulphur, boron, silicon, selenium, tellurium, halogens, and oxoanions of metals. Suitable anions include, but are not limited to tetrafluoroborate ($BF_4^-$), bis(trifluoromethylsulfonyl)amide ($NTf_2^-$), hydrogensulfate ($HSO_4^-$), methylsulfonate, trifluoromethylsulfonate, methoxyethylsulfonate, 2-methoxyethylsulfonate, ethoxyethylsulfonate, 2-ethoxyethylsulfonate, (methoxypropoxy)propylsulfonate, 1-(1-methoxypropoxy)propylsulfonate, (methoxyethoxy)-ethylsulfonate, 1-(1-methoxyethoxy)ethylsulfonate, methyl (diethoxy)ethylsulfonate, 1-methyl(diethoxy)ethylsulfonate, toluene-4-sulfonate, trifluoromethylsulfonyl, carboxylate, formate, acetate, dicyanimide, trifluoroacetate, and bis(trifluoromethanesulfonyl)imide.

When a mixture of two or more ionic liquids is used, the cation and/or the anion of each of the ionic liquids present in the mixture may be the same or different. In one embodiment, the or each ionic liquid comprises at least one $C_2$-$C_6$ alkyl group. The $C_2$-$C_6$ alkyl group may be a substituent on either the anion or the cation of the ionic liquid(s). More preferably the $C_2$-$C_6$ alkyl group is a substituent on the cation of the ionic liquid(s).

Suitable ionic liquids useful in the present invention include:
N-ethylpyridinium bis(trifluoromethanesulfonyl)amide;
N-Methyl-N'-butylimidazolium tetrafluoroborate;
N-Methyl-N'-butylimidazolium bis(trifluoromethanesulfonyl)amide;
trimethyl-(2-hydroxyethyl)ammonium bis(trifluoromethanesulfonyl)amide;
N-Methyl-N'-ethylimidazolium 2-methoxyethylsulfonate;
N-butyl-N-methylpyrrolidinium bis(trifluoromethanesulfonyl)amide;
N-Methyl-N'-butylimidazolium 2-methoxyethylsulfonate;
N-Methyl-N'-butylimidazolium bromide;
N-Methyl-N'-butylimidazolium 2-ethoxyethylsulfonate;
N-Methyl-N'-butylimidazolium 1-(1-methoxypropoxy)-propylsulfonate;
N-Methyl-N'-butylimidazolium 1-(1-methoxyethoxy)-ethylsulfonate;
N-Methyl-N'-butylimidazolium 1-methyl(diethoxy)ethylsulfonate; or
N-Methyl-N-(butyl-4-sulfonic acid)pyrrolidinium trifluoromethanesulfonate;
tetradecyltrihexylphosphonium chloride;
and mixtures thereof.

Suitable dicarboxylic acids include those of the general formula HOOC—$R^a$—COOH where $R^a$ is a divalent aliphatic, alicyclic or aromatic radical and these radicals can bear one or more inert substituents. Typically, $R^a$ is a divalent $C_1$-$C_{20}$ aliphatic radical, a divalent $C_5$-$C_{18}$ alicyclic radical or a divalent benzene radical. Thus, the dicarboxylic acid may be selected from aliphatic acids of the formula $C_nH_{2n}(COOH)_2$ wherein n is 1 to 20, particularly 2 to 8, particularly succinic acid, glutaric acid, adipic acid, pimelic acid, suberic acid, azeleic acid and sebacic acid, and particularly succinic acid, adipic acid and sebacic acid. Suitable aromatic dicarboxylic acids include aromatic dicarboxylic acids having 7 to 20 carbon atoms, such as terephthalic acid (TPA), isophthalic acid (IPA), phthalic acid, t-butylisophthalic acid, 3-(4-carboxyphenyl)-1,1,3-trimethyl-5-indan carboxylic acid (PIDA; also known as phenylindane dicarboxylic acid), and 2,5-, 2,6- or 2,7-naphthalene-dicarboxylic acid. The dicarboxylic acids may be used in the process of the invention in the form of their corresponding esters, as is well-known in the art, including for instance the dimethyl esters or other lower alkyl (e.g. $C_1$ to $C_6$) esters, or the diphenyl esters or other aryl esters. In a preferred embodiment $R^a$ is a $C_2$-$C_8$ straight chain alkylene radical.

Suitable diamines for use in the present invention may be aliphatic or aromatic, and include those described by the general formula $R^1HN$—$R^b$—$NHR^1$, where $R^b$ is a divalent organic radical and each $R^1$ is independently hydrogen or a univalent organic radical. $R^b$ can be a divalent aliphatic, alicyclic or aromatic radical and these radicals can bear one or more inert substituents. Similarly, each $R^1$ can be independently a hydrogen or a univalent aliphatic, alicyclic or aromatic radical and each one of these radicals can also bear one or more inert substituents. By the term "inert" is meant that the substituent is essentially non-reactive with the reactants, catalysts and products of the process under process conditions. Typically, $R^b$ is a divalent $C_1$-$C_{20}$ aliphatic radical, a divalent $C_5$-$C_{18}$ alicyclic radical or a divalent benzene radical and in one preferred embodiment $R^b$ is a $C_2$-$C_8$ straight chain alkylene radical. Typically, $R^1$ is hydrogen or a $C_1$-$C_{20}$ aliphatic radical, $C_5$-$C_7$ alicyclic or a phenyl radical. Preferably, $R^1$ is hydrogen or a $C_1$-$C_4$ alkyl radical. Representative diamines include tetramethylene diamine; hexamethylenediamine; methylpentamethylenediamine; p-diaminodicyclohexylmethane; 1,3-bis-(aminomethyl)cyclohexane; 1-methyl 2,4-diaminocyclohexane; 4,4'-diaminodicyclohexyl ether; 4,4'-diaminodicyclohexyl sulphide; 4,4'-diaminodicyclohexyl sulfone; octamethylene diamine; decamethylene diamine; dodecamethylene diamine; m- or p-bis-(aminoalkylbenzenes) such as m- or p-xylylenediamine, m- or p-bis (aminoethylbenzene) or 2,4 bis(aminomethyl)chlorobenzene; 1,4-dimethyleneamino-1-phenyl-1,2,3,4-tetrahydronaphthalene; and the like.

Suitable nylon salts include those comprising the aforementioned dicarboxylic acids and diamines.

As used herein the term "lactams" includes lactams and their corresponding omega-aminoalkanoic acids (e.g. caprolactam and 6-aminohexanoic acid), as well as mixtures thereof. Suitable lactams for use in the present invention include the $C_5$ to $C_{12}$ lactams and their corresponding omega-aminoalkanoic acids, such as caprolactam, lauryllactam, epsilon-aminocaproic acid, omega-aminolauric acid, 11-amino-undecanoic acid, 12-amino-dodecanoic acid, aminomethylbenzoic acid, and the like and mixtures thereof. A particularly preferred lactam is caprolactam.

In many applications linear polyamides are preferred, although there are occasions where the formation of branch points within the polyamide structure may confer benefits. Such branch points may be created by the use of one or more multi-functional precursors (for instance, tri-functional or tetra-functional molecules) which contain greater than two functional groups, for instance, amine and/or carboxylic acid and/or ester group(s), as are well known in the art. In this embodiment, suitable multi-functional precursors may be selected from dicarboxylic acids and diamines (or salts thereof) according to the general formulae given above, and further incorporating one or more additional amine and/or carboxylic acid and/or ester group(s). Examples of such species include, but are not limited to: bishexamethylenetriamine; 1,3,5-benzenetricarboxylic acid (Trimesic acid); 3,5, 3',5'-biphenyltertacarboxylic acid; and 5-aminomethyl-1,3-benzenedicarboxylic acid. Use of such of such multifunctional species allows the formation of branched, hyperbranched and dendritic structured polyamides.

The process of the present invention has the following advantages:
(i) Polymerization may be conducted at lower temperatures than conventional conditions because it is not necessary to keep the polymer in the molten state or of a sufficiently low melt viscosity, since the polymer is either dissolved in the ionic liquid or in slurry form in the ionic liquid (where the viscosity of importance is that of the ionic liquid, rather than the polymer in suspension). As a consequence of the lower temperatures used, undesirable side reaction is minimised.
(ii) The viscosity of the solution or slurry is low compared to a typical polyamide melt process.
(iii) Water is simply distilled out of the reaction process, in order to drive the polymerization reaction.
(iv) Typical solvents used in solution polymerization processes are highly acidic or toxic or volatile, whereas ionic liquids suitable for the present invention are neutral, benign and non-volatile.
(v) The product of the polycondensation reaction from a nylon salt is water, whereas other means of generating polyamides may evolve noxious species, such as HCl or phenol.
(vi) Nylon salts are typically benign, whereas other raw material routes to polyamides use noxious substances such as diacid chlorides or diisocyanates.
(vii) The present invention therefore provides the capability to readily synthesise polyamides hitherto considered as being difficult to make.

A particular utility for the present application is the preparation of a polyamide, for instance nylon-4,6, having a relatively higher melting point (relative to, for instance, nylon-6), and in particular a melting point of at least about 260°, more particularly at least about 280° C., more particularly at least about 290° C., more particularly at least about 300° C., and more particularly at least about 320° C. In one embodiment, the present application is directed to a process for manufacturing aliphatic polyamides and mixed aliphatic-aromatic polyamides.

TEST METHODS (i) Polymer relative viscosity RV is measured using the formic acid method according to ASTM D789-86.
(ii) Polymer amine ends (A.E.G.) was measured by directed titration with standardized perchloric acid solution of weighed polymer samples taken up in solution after filtration to remove insoluble components.
(iii) Melting point was measured by differential scanning calorimetry at a scan rate of 20° C./minute.

The invention is further illustrated by the following examples, It will be appreciated that the examples are for illustrative purposes only and are not intended to limit the invention as described above. Modification of detail may be made without departing from the scope of the invention.

EXAMPLES

Example 1

A mixture of the ionic liquid 1-butyl-3-methylimidazolium chloride ([$C_4$mim]Cl, 40 g) and nylon-6,6 salt (16.17 g) was purged with a stream of nitrogen for 15 minutes with stirring in a flask connected to a condenser. The stirred mixture was heated to 180° C. under the stream of nitrogen for 6 h. A gentle vacuum was applied near the end of the reaction by means of a Schlenk line to aid removal of the water from the system. The reaction mixture was allowed to cool down. The resulting paste was mixed with water (400 mL). The resulting suspension was stirred under reflux and allowed to settle. The resulting product was collected by filtration, washed with hot portions of water and dried under air stream to give a dark grey solid (7.18 g). The mother liquor was concentrated under reduced pressure to recover the ionic liquid, as a brownish turbid viscous liquid. The results from analysis of the product are presented in Table 1 below.

Example 2

A mixture of [$C_4$mim]Cl (32.37 g) and nylon-6,6 salt (12.94 g) was reacted according to the method of Example 1, but at 200° C. Furthermore, the purge flow of nitrogen near the end of the reaction was increased to aid removal of the water from the system, instead of applying a gentle vacuum. The resulting paste was then mixed with water (300 mL), and the rest of the work-up carried out as in Example 1. The product was isolated as a grey solid (3.47 g). The results from analysis of the product are presented in Table 1 below.

Example 3

A mixture of trihexyltetradecylphosphonium chloride ([$P_{6\,6\,6\,14}$]Cl, 40.00 g) and nylon-6,6 salt (15.92 g) was reacted according to the method of Example 1. The resulting paste was then mixed with chloroform (400 mL), and the rest of the work-up carried out as in Example 1. The resulting suspension was stirred under reflux and allowed to settle. The resulting product was collected by filtration, washed with hot portions of chloroform and dried under air stream to give a white solid (14.29 g). The ionic liquid ([$P_{6\,6\,6\,14}$]Cl) was recovered according to the method in Example 1 to give a yellow viscous liquid. The results from analysis of the solid product are presented in Table 1 below.

Example 4

A mixture of [$P_{6\,6\,6\,14}$]Cl (39.00 g) and nylon-6,6 salt (16.10 g) was reacted according to the method of Example 2, but at 180° C. The resulting paste was then mixed with ethyl acetate (400 mL). The resulting suspension was stirred under reflux and allowed to settle. The resulting product was collected by filtration, washed with hot portions of ethyl acetate and dried under air stream to give a white solid (13.66 g). The ionic liquid ([$P_{6\,6\,6\,14}$]Cl) was recovered according to the method in Example 1 to give a yellow viscous liquid. The results from analysis of the solid product are presented in Table 1 below.

Example 5

A mixture of [$P_{6\,6\,6\,14}$]Cl (97.38 g) and nylon-6,6 salt (10.03 g) was reacted according to the method in Example 2, but at 180° C. The resulting paste was then mixed with ethyl acetate (400 mL), and the rest of the work-up carried out according to the method in Example 4. The product was obtained as a white solid (5.026 g). The ionic liquid ([$P_{6\,6\,6\,14}$]Cl) was recovered according to the method in Example 1 to give a yellow viscous liquid. The results from analysis of the solid product are presented in Table 1 below.

Example 6

A mixture of [$P_{6\,6\,6\,14}$]Cl (100.08 g) and nylon-6,6 salt (23.24 g) was reacted according to the method Example 2, but for 4 hours at 250° C. At the end of the reaction, the orange homogeneous thick liquid was poured into an ethyl acetate/hexane mixture (60:40 v/v, 400 mL) and the resulting suspension heated under reflux. The product was then collected by filtration, washed with hot portions of the same solvent mixture and dried to give a white solid (21.27 g). The ionic liquid ([$P_{6\,6\,6\,14}$]Cl) was recovered according to the method in Example 1 to give a yellow viscous liquid. The results from analysis of the solid product are presented in Table 1 below.

Example 7

A mixture of [$P_{6\,6\,6\,14}$]Cl (99.40 g) and nylon-6,6 salt (23.14 g) was reacted according to the method in Example 2, but for 3 hours at 250° C., and with a side condenser connected to the reaction flask, in order to continuously remove the water released in the reaction. At the end of the reaction, the orange homogeneous thick liquid was poured into ethyl acetate (400 mL) and the resulting suspension heated under reflux. The product was then collected by filtration, washed with hot portions of ethyl acetate and dried to give a yellowish paste. This paste was transferred to a cellulose thimble and set in a Soxhlet extractor, where it was extracted with ethyl acetate (300 mL). After extraction, the contents of the thimble were dried to give a yellowish solid (16.38 g). The ionic liquid was recovered according to the method in Example 1, but the Soxhlet extracts were also concentrated at reduced pressure giving further recovered ionic liquid. All the ionic liquids portions were combined and recovered as a turbid yellow viscous liquid. The results from analysis of the solid product are presented in Table 1 below.

Example 8

A mixture of [$P_{6\,6\,6\,14}$]Cl (82.82 g) and nylon-6,6 salt (18.62 g) was reacted according to the method in Example 7, but for 6 hours. The product was obtained as a yellowish solid (13.72 g). The ionic liquid ([$P_{6\,6\,6\,14}$]Cl) was recovered according to the method in Example 7 to give a yellow viscous liquid. The results from analysis of the solid product are presented in Table 1 below.

Example 9

A mixture of [$P_{6\,6\,6\,14}$]Cl (84.82 g) and nylon-6,6 salt (19.76 g) was reacted according to the method in Example 7, but hexamethylenediamine (35.4 mg, 0.40% mols relative to nylon-6,6 salt) was added prior to the start of the reaction. The product was obtained as a yellowish solid (14.02 g). The ionic liquid [$P_{6\,6\,6\,14}$]Cl was recovered according to the method in Example 7 to give a yellow viscous liquid. The results from analysis of the solid product are presented in Table 1 below.

Example 10

A mixture of [$P_{6\,6\,6\,14}$]Cl (80.15 g) and nylon-6,6 salt (19.27 g) was reacted according to the method in Example 7, but for 4 hours and hexamethylenediamine (47.0 mg, 0.54% mols relative to nylon-6,6 salt) was added prior to the start of the reaction. The product was obtained as a yellowish solid (12.69 g). The ionic liquid ([$P_{6\,6\,6\,14}$]Cl) was recovered according to the method in Example 7 to give a yellow viscous liquid. The results from analysis of the solid product are presented in Table 1 below.

Example 11

A mixture of [$P_{6\,6\,6\,14}$]Cl (79.66 g) and nylon-6,6 salt (19.09 g) was reacted according to the method in Example 7, but hexamethylenediamine (92.5 mg, 1.07% mols relative to nylon-6,6 salt) was added prior to the start of the reaction. The product was obtained as a yellowish solid (13.37 g). The ionic liquid ([$P_{6\,6\,6\,14}$]Cl) was recovered according to the method in Example 7 to give a yellow viscous liquid. The results from analysis of the solid product are presented in Table 1 below.

Example 12

A mixture of 1-butyl-3-methylimidazolium bis{(trifluoromethyl)sulfonyl}amide ([$C_4$mim][$Tf_2N$], 49.14 g) and nylon-6,6 salt (12.32 g) was reacted according to the method in Example 2, but for 3 hours at 250° C. The resulting yellowish reaction mixture slurry was mixed with ethyl acetate (400 mL) and heated under reflux. The product was collected by filtration of the resulting suspension, washed with hot portions of ethyl acetate and dried to yield a pale yellow solid (11.25 g). The ionic liquid ([$C_4$mim][$Tf_2N$]) was recovered according to the method in Example 1 to give a yellow viscous liquid. The results from analysis of the solid product are presented in Table 1 below.

Example 13

A mixture of [$C_4$mim][$Tf_2N$] (48.68 g) and nylon-6,6 salt (12.01 g) was reacted according to the method in Example 7, but for 4 hours. The crude product was extracted in a Soxhlet set-up as described in Example 7, giving a pale yellow solid (11.01 g). The ionic liquid ([C$_4$mim][Tf$_2$N]) was recovered according to the method in Example 7 to give a yellow viscous liquid. The results from analysis of the solid product are presented in Table 1 below.

Example 14

A mixture of [C$_4$mim][Tf$_2$N] (48.07 g) and nylon-6,6 salt (12.02 g) was reacted according to the method in Example 1. At the end of the reaction, the resulting slurry was mixed with ethyl acetate (400 mL) and heated under reflux. The product having been collected by filtration of the resulting suspension, was washed with hot portions of ethyl acetate and extracted in a Soxhlet extractor as in Example 7, giving a pale yellow solid (10.95 g). The ionic liquid ([C$_4$mim][Tf$_2$N]) was recovered according to the method in Example 7 to give a yellow viscous liquid. The results from analysis of the solid product are presented in Table 1 below.

TABLE 1

| Example | Nylon-6,6 salt (% weight) | Yield (%) | Product | m.p. (° C.) | R.V. | A.E.G. |
|---|---|---|---|---|---|---|
| 1 | 29 | 48 | Dark grey | 235 | 2.25 | |
| 2 | 29 | 38 | Dark grey | 227 | | |
| 3 | 29 | 104 | White | 243 | 2.71 | |
| 4 | 29 | 98 | White | 242 | 2.42 | |
| 5 | 9 | 58 | White | 223 | | |
| 6 | 19 | 106 | White | 249 | 8.16 | |
| 7 | 19 | 82 | Yellowish | 241 | 2.94 | 2.97 |
| 8 | 18 | 85 | Yellowish | 237 | 3.22 | |
| 9 | 19 | 82 | Yellowish | 241 | 3.02 | |
| 10 | 19 | 76 | Brownish | 248 | 2.93 | |
| 11 | 19 | 81 | Yellowish | 250 | 4.6 | 8.4 |
| 12 | 20 | 106 | Pale yellow | 238 | 7.21 | 24.4 |
| 13 | 20 | 106 | Pale yellow | 238 | 3.3 | 30.8 |
| 14 | 20 | 106 | Pale yellow | 217 | 6.2 | 49.8 |

Example 15

Preparation of Nylon 4,6

93.7 g [P66614]Cl is purged with a stream of nitrogen for 15 minutes with stirring. 23.4 g of Nylon 4,6 salt (0.1 mol) is added. The stirred mixture is heated to 250° C. under the stream of nitrogen for 6 hours, the water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Example 16

Preparation of Nylon 6,T/D,T (50/50)

112.9 g [P66614]Cl is purged with a stream of nitrogen for 15 minutes with stirring. 16.6 g terephthalic acid (0.1 mol) is added followed by 5.8 g hexamethylenediamine (0.05 mol) and 5.8 g methylpentamethylenediamine (0.05 mol). The stirred mixture is heated to 250° C. under the stream of nitrogen for 6 hours, the water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Example 17

Preparation of Nylon 6/6,T/(50/50)

92.4 g [P66614]Cl is purged with a stream of nitrogen for 15 minutes with stirring. 3.4 g (0.03 mol) of caprolactam together with 65.7 g of a 30 w % aqueous solution comprising 11.6 g terephthalic acid (0.07 mol) and 8.1 g hexamethylenediamine (0.07 mol) is added. The stirred mixture is heated to 250° C. under the stream of nitrogen for 6 hours, the water and water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Example 18

Preparation of Nylon 6/6,T/(50/50)

92.4 g [P66614]Cl is purged with a stream of nitrogen for 15 minutes with stirring. 3.9 g (0.03 mol) of aminocaproic acid together with 65.7 g of a 30 w % aqueous solution comprising 11.6 g terephthalic acid (0.07 mol) and 8.1 g hexamethylenediamine (0.07 mol) is added. The stirred mixture is heated to 250° C. under the stream of nitrogen for 6 hours, the water and water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Example 19

Preparation of Aramide pP,T 109.7 g [P66614]Cl is purged with a stream of nitrogen for 15 minutes with stirring. 10.8 g p-phenylenediamine (0.1 mol) is added followed by 16.6 g terephthalic acid (0.1 mol). The stirred mixture is heated to 250° C. under the stream of nitrogen for 6 hours, the water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Example 20

Preparation of Aramide mP,I 109.7 g [P66614]Cl is purged with a stream of nitrogen for 15 minutes with stirring. 10.8 g m-phenylenediamine (0.1 mol) is added followed by 16.6 g isophthalic acid (0.1 mol). The stirred mixture is heated to 250° C. under the stream of nitrogen for 6 hours, the water of polycondensation is distilled off. The purge flow of nitrogen near the end of the reaction is increased to aid removal of the water from the system. The reaction mixture is allowed to cool down. The reaction mixture is carefully poured with vigorous stirring into 900 mL of a 60/40 mix of ethyl acetate/hexane and the solid polymer is filtered off. The polymer is subject to soxhlet extraction with ethyl acetate for 8 hours and the polymer isolated and dried.

Processes for increasing the molecular weight and viscosity of polyamides are known from the patent art to the skilled person. For example, U.S. Pat. No. 5,543,495 to Anolick et al. discloses a Process for increasing the molecular weight of polyamides and other condensation polymers by first injecting an inert gas into the polymer melt at elevated pressure, then stripping the volatiles from the polymer through the application of reduced pressure, followed by holding the polymer at elevated temperatures long enough for a reaction to occur which builds polymer molecular weight and thus its relative viscosity. Similarly, U.S. Pat. No. 5,955,569A to Dujari et al. discloses a method for solid phase polymerization and increasing the relative viscosity and molecular weight of a polyamide polymer (such as nylon 6,6, nylon 6, and the like) while in the solid state involving the use of a phosphorus-containing catalyst (such as 2(2'-pyridyl) ethyl phosphonic acid or the like) in combination with an oxygen free gas characterized by a low dew point temperature; typically below 30° C. and preferably below −30° C. The disclosures of the Anolick et al. and Dujari et al. references are hereby incorporated in their entirety by reference forming a portion of this disclosure.

The foregoing disclosure constitutes a description of specific embodiments illustrating how the invention may be used and applied. Such embodiments are only exemplary. The invention in its broadest aspects is further defined in the claims which follow. These claims and terms used therein are to be taken as variants of the invention described. These claims are not restricted to such variants but are to be read as covering the full scope of the invention implicit within the disclosure herein.

The invention claimed is:

1. A process for making a polyamide polymer, said process comprising:
   a) sparging one or more ionic liquid(s) with nitrogen for up to one hour;
   b) heating, in the one or more sparged ionic liquid(s), one or more polyamide precursor(s) to form the polyamide polymer, wherein the one or more polyamide precursor(s) is:
      (i) one or more free dicarboxylic acid(s) or ester(s) thereof, with one or more diamine(s); or
      (ii) one or more salt(s) of a dicarboxylic acid with a diamine; or
      (iii) one or more lactam(s); or
      (iv) mixtures of any of the foregoing precursors (i) to (iii); and
   c) recovering the one or more ionic liquid(s);
   wherein the heating is from about 3 to about 6 hours at a temperature from about 200° C. to 250° C.

2. The process according to claim 1 wherein said polyamide is an aromatic polyamide.

3. The process according to claim 1 wherein said polyamide is an aliphatic polyamide.

4. The process according to claim 1 wherein said polyamide is a mixed aliphatic-aromatic polyamide.

5. The process according to claim 1 wherein said polyamide is a linear polyamide.

6. The process according to claim 1 wherein said lactam is caprolactam.

7. The process according to claim 1 wherein said diamine is tetramethylene diamine and said dicarboxylic acid is adipic acid.

8. The process according to claim 1 wherein the polyamide has a melting point of at least about 260° C.

9. The process according to claim 1 wherein said ionic liquid comprises a cation selected from 1-alkylpyridinium, alkyl- or polyalkyl-pyridinium, phosphonium, alkyl- or polyalkyl-phosphonium, imidazolium, alkyl- or polyalkyl-imidazolium, ammonium, alkyl- or polyalkyl-ammonium, alkyl- or polyalkyl-pyrazolium, alkyl- or polyalkyl-pyrrolidinium, alkyl or polyalkyl-azepinium, alkyloxonium or alkylsulfonium.

10. The process according to claim 9 wherein said ionic liquid comprises a cation selected from N-ethylpyridinium; N-butyl-N-methylpyrrolidinium; N-methyl-N-(butyl-4-sulfonic acid)pyrrolidinium; 1-butyl-3-methylimidazolium; N-methyl-N'-ethylimidazolium; trimethyl-(2-hydroxyethyl)ammonium; and tetradecyltrihexylphosphonium.

11. The process according to claim 1 wherein said ionic liquid comprises an anion selected from halide, nitrate, alkylsulfonate, alkyl polyalkoxysulfonate, hydrogensulfonate, hexafluorophosphate, and tetrafluoroborate.

12. The process according to claim 11 wherein said ionic liquid comprises an anion selected from bis(trifluoromethylsulfonyl)amide (NTf2−), methylsulfonate, trifluoromethylsulfonate, methoxyethylsulfonate, 2-methoxyethylsulfonate, ethoxyethylsulfonate, 2-ethoxyethylsulfonate, (methoxypropoxy)propylsulfonate, 1-(1-methoxyethoxy)-ethylsulfonate, methyl(diethoxy)ethylsulfonate, 1-methyl(diethoxy)ethylsulfonate, toluene-4-sulfonate, trifluoromethylsulfonyl, carboxylate, formate, acetate, dicyanimide, trifluloroacetate, and bis(trifluoromethanesulfonyl)imide.

13. The process according to claim 1 wherein said ionic liquid is selected from:
   N-ethylpyridinium bis(trifluoromethanesulfonyl)amide;
   N-Methyl-N'-butylimidazolium tetrafluoroborate;
   N-Methyl-N'-butylimidazolium bis(trifluoromethanesulfonyl)amide;
   trimethyl-(2-hydroxyethyl)ammonium bis(trifluoromethanesulfonyl)amide;
   N-Methyl-N'-ethylimidazolium 2-methoxyethylsulfonate;
   N-butyl-N-methylpyrrolidinium bis(trifluoromethanesulfonyl)amide;
   N-Methyl-N'-butylimidazolium 2-methoxyethylsulfonate;
   N-Methyl-N'-butylimidazolium bromide;
   N-Methyl-N'-butylimidazolium 2-ethoxyethylsulfonate;
   N-Methyl-N'-butylimidazolium 1-(1-methoxypropoxy)propylsulfonate
   N-Methyl-N'-butylimidazolium 1-(1-methoxypropoxy)ethylsulfonate N-Methyl-N'-butylimidazolium 1-methyl(diethoxy)ethylsulfonate;

N-Methyl-N-(butyl-4-sulfonic acid)pyrrolidinium trifluoromethanesulfonate;

Tetradecyltrihdexylphosphonium chloride; or mixtures thereof.

14. The process of claim 1, wherein the one or more ionic liquid(s) is sparged with nitrogen for about 15 minutes.

15. A process for making a polyamide polymer, said process comprising:
   a) heating, in one or more ionic liquid(s), one or more polyamide precursor(s) to form the polyamide polymer, wherein the one or more polyamide precursor(s) is:
      (i) one or more free dicarboxylic acid(s) or ester(s) thereof, with one or more diamine(s); or
      (ii) one or more salt(s) of a dicarboxylic acid with a diamine; or
      (iii) one or more lactam(s); or
      (iv) mixtures of any of the foregoing precursors (i) to (iii); and
   b) continuously distilling off water formed during the heating; and
   c) recovering the one or more ionic liquid(s);
   wherein the heating is for up to about 10 hours at a temperature from about 200° C. to 250° C.

16. The process for making a polyamide polymer according to claim 15, wherein the heating occurs in the presence of nitrogen and wherein the flow of nitrogen is increased towards the end of the reaction to aid in water removal.

17. The process for making a polyamide polymer according to claim 15, wherein the one or more ionic liquid(s) is sparged with nitrogen prior to being combined with the one or more polyamide precursor(s).

18. The process for making a polyamide polymer according to claim 15, wherein recovering the one or more ionic liquid(s) comprises a) separating the polyamide polymer from the one or more ionic liquid(s) by filtration to form a polyamide polymer product and a mother liquor; and b) concentrating the mother liquor under reduced pressure to recover the one or more ionic liquid(s).

* * * * *